United States Patent [19]
Arff

[11] 3,745,750
[45] July 17, 1973

[54] AIR PURIFIER

[76] Inventor: John H. Arff, 118 N.E. 24th Avenue, Portland, Oreg.

[22] Filed: Jan. 11, 1971

[21] Appl. No.: 105,344

[52] U.S. Cl.............. 55/102, 21/74 A, 21/DIG. 2, 55/124, 55/138, 55/139, 55/278, 55/279, 55/316, 55/357, 55/387, 55/413, 55/467, 55/514, 55/524, 204/316, 204/319
[51] Int. Cl. .............................................. B03c 3/32
[58] Field of Search...................... 55/102, 124, 126, 55/279, 387, 278, 524, 514; 21/74 R, 74 A, DIG. 2; 204/316, 319, 314

[56] References Cited
UNITED STATES PATENTS

| | | | |
|---|---|---|---|
| 1,922,416 | 8/1933 | Block | 55/74 |
| 1,965,187 | 7/1934 | Hartman | 55/102 X |
| 2,038,071 | 4/1936 | Wilhelm | 55/278 |
| 2,019,186 | 10/1935 | Kaiser | 55/278 |
| 2,125,672 | 8/1938 | Garrett | 204/314 |
| 2,628,083 | 2/1953 | Rense | 55/279 X |
| 2,908,347 | 10/1959 | Roos | 55/132 |
| 2,941,265 | 6/1960 | Isenberg et al. | 21/74 |
| 3,071,828 | 1/1963 | Cornell, Jr. | 21/74 |
| 3,509,697 | 5/1970 | Dewey et al. | 55/276 |

*Primary Examiner*—Dennis E. Talbert, Jr.
*Attorney*—Eugene M. Eckelman

[57] ABSTRACT

An air purifier having an electrostatic filter and a charcoal filter for removing airborne impurities. The purifier has blower means for moving air therethrough and also includes air treating means in the form of an ozone generator or ultraviolet lamp. The charcoal filter has longitudinal openings which in a preferred construction are angled upwardly to move the output air toward the ceiling. Electrical control means are provided for the electrostatic filter, the blower, and the air treating means, including a safety switch which deadens the circuit when a cover portion of the purifier is removed.

2 Claims, 5 Drawing Figures

JOHN H. ARFF
INVENTOR.

BY Eugene M. Eppelman
ATTY.

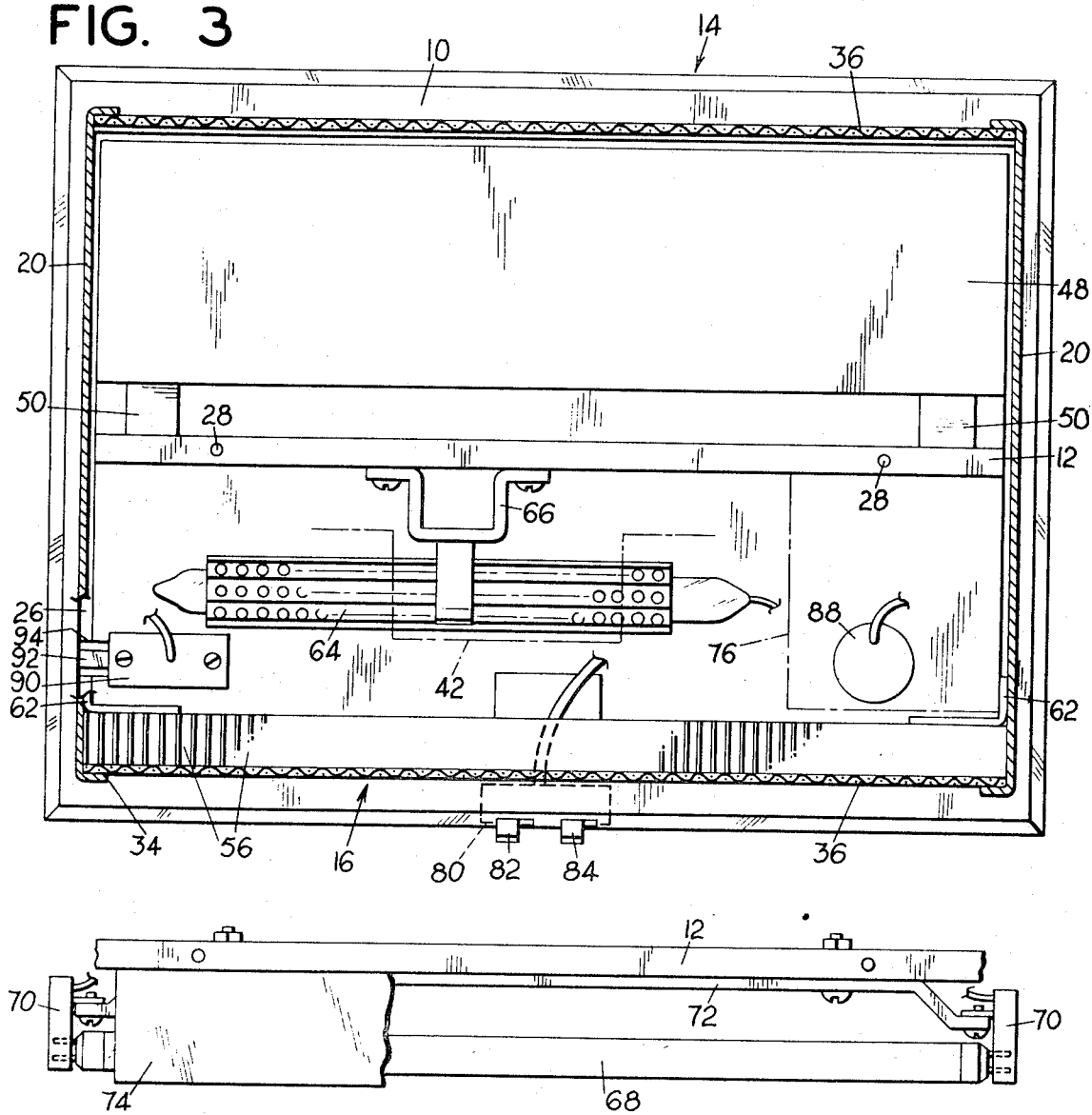
FIG. 3
FIG. 5
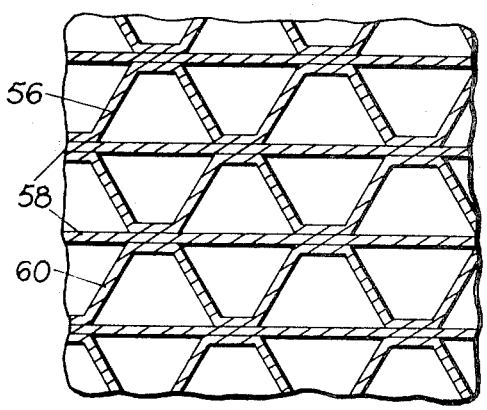
FIG. 4
JOHN H. ARFF
INVENTOR
BY Eugene M. Eckelman
ATTY.

AIR PURIFIER

BACKGROUND OF THE INVENTION

This invention relates to new and useful improvements in air purifiers.

Air purifiers have heretofore been provided for filtering airborne impurities such as dust, pollen, smoke, and the like. Such purifiers, while removing dust particles and the like which are capable of filtering out, have not been completely efficient in that they do not purify the air. Such prior apparatuses have also relied solely upon charcoal filters to remove odors in the room. Such charcoal filters, however, are not capable of removing extensive odors, at least with any efficiency.

SUMMARY OF THE INVENTION

According to the invention and forming a primary objective thereof, an air purifier is provided which overcomes the disadvantages of prior art devices in that it efficiently filters out airborne particles and also is capable of removing odors and other impurities heretofore not being capable of being filtered.

A more particular object is to provide an air purifier which includes in combination an electrostatic filter, a charcoal filter, and air treating means such as an ozone generator or an ultraviolet lamp.

Another object is to provide in an air purifier of the type described a novel charcoal filter which comprises charcoal-impregnated cardboard having longitudinal openings which are inclined upwardly to move output air upwardly toward the ceiling.

Another object of the present invention is to provide an air purifier of the type described having novel cutoff switch means operating automatically to deaden the circuit to the entire system when the cover of the purifier is removed.

The invention will be better understood and additional objects and advantages will become apparent from the following description taken in connection with the accompanying drawings which illustrate a preferred form of the device.

BRIEF DESCRIPTION OF THE DRAWINGS

FIG. 3 is a horizontal sectional view taken on the line 3—3 of FIG. 1;

FIG. 4 is an enlarged fragmentary sectional view of the charcoal filter construction, taken on the line 4—4 of FIG. 2; and FIG. 5 is a plan view of a modified form of air purifying means utilized in the filter.

DETAILED DESCRIPTION OF PREFERRED EMBODIMENTS

Figure 1:
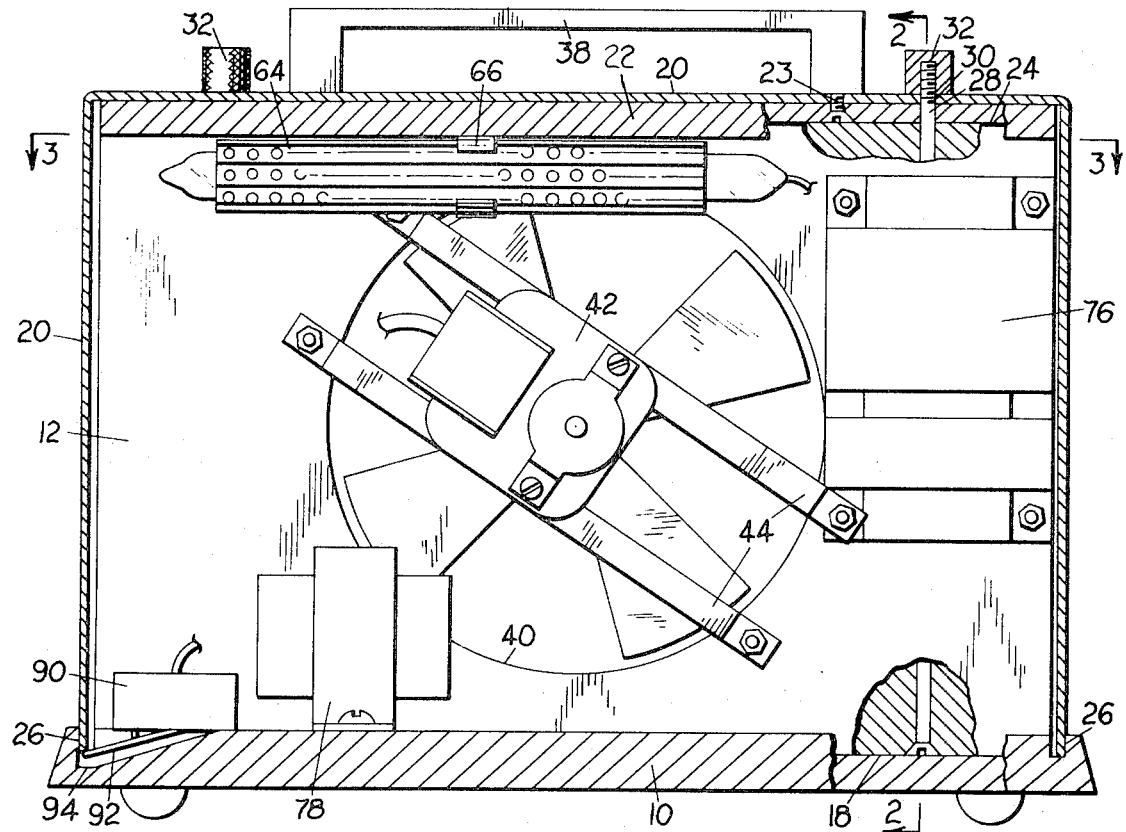
FIG. 1 is a longitudinal vertical sectional view of the invention taken on the line 1—1 of FIG. 2.
Figure 2:
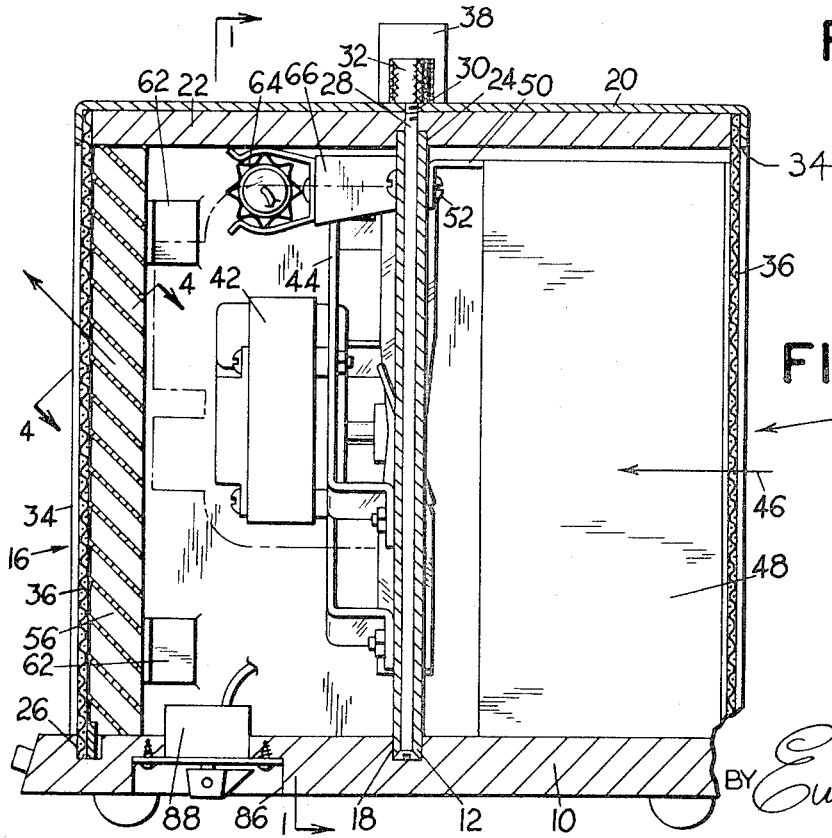
FIG. 2 is a transverse vertical sectional view taken on the line 2—2 of FIG. 1.

Referring in particular to FIGS. 1, 2 and 3, the present purifier comprises a rigid base 10 having an integral, transverse wall or partition 12 at about the center between the inlet end 14 and the outlet end 16. Wall 12 is secured in a transverse groove 18 in the base 10, FIG. 2, by a press fit or by other means such as by an adhesive.

The purifier has a cover 20 with an integral reinforcing plate 22 secured to its under surface, as by screws 23, FIG. 1. Plate 22 has a transverse groove 24 on its lower surface for removably receiving the top end of wall 12. Cover 20 comprises a box-like walled enclosure open at the bottom and having the bottom edges of its side and rear walls engaged in a groove 26 provided in the upper surface of said base. The cover is removably secured to the base by screws 28 extending through the upright wall 12 and having threaded ends projecting through apertures 30 in the top wall of the cover for receiving nuts 32. Upon removing the nuts 32, the cover can be taken off whereby access may be had to interior parts. In removing the cover, the bottom edges of the side and rear walls thereof disengage from groove 26 and the top plate 22 disengages from the top of wall 12.

Cover 20 has openings 34 on its inlet and outlet ends, FIG. 2, and these openings are covered with a mesh material 36 such as screen. The cover has a carrying handle 38 on the top thereof.

Central wall 12 has an opening 40, FIG. 1, and supported on this wall at the opening is a blower or fan 42. Blower 42 is secured on the wall 12 by suitable brackets 44, and upon operation thereof is adapted to move air from the inlet end 14 to the outlet end 16, namely, in the direction of arrow 46, FIG. 2.

Mounted in the housing just inside of mesh covering 36 at the inlet end 14 is an electrostatic filter 48. Such filter is of conventional construction wherein airborne particles are subjected to an ionizing action to give them an electrical charge and then are subjected to a collecting section including oppositely charged plates wherein the particles are deposited on such plates. Filter 48 has a pair of integral fingers 50, FIG. 2, arranged to be removably secured to the wall 12 by screws 52. The electrostatic filter may be removed from the housing for cleansing simply by removing holding screws 52.

The present air purifier also has a filter 56 disposed at the outlet end 16. Filter 56 comprises a cardboard filter impregnated with charcoal. Such charcoal is attached to the cardboard by water glass, and a preferred charcoal used herein is coconut shell charcoal since it is extremely efficient in filtering out large and small particles, even gas particles. With particular reference to FIG. 4, filter 56 comprises a plurality of parallel cardboard plates 58 between which are attached cardboard cell-like filler members 60. According to the present invention, the plates 58 are inclined upwardly, best seen in FIG. 2, whereby the output from the filter 56 is directed toward the ceiling. Thus, not only does the output from the present purifier force warm air off the ceiling area but also prevents the output from impinging directly against occupants in the room. The cell-like structure of filter 56 provides a large area for exposure of the air to the charcoal filter material and thus serves to effectively filter out any particles which still are present in the air after passing through the electrostatic filter.

The side walls of the housing have one or more tabs 62 which project laterally and are arranged to hold the filter 56 in place. The tabs 62 are located selectively to hold the filter 56 in place but allow the filter to be removed by pulling it upwardly, thus allowing the filter to be readily removed and installed.

Forming a part of the present purifier are treating means which in one embodiment, FIGS. 1-3, comprises an ozone generator 64 mounted on a bracket 66 in turn secured to the wall 12. Preferably generator 24 is mounted adjacent the upper end of the apparatus. Such generator treats the air flowing through the present device to provide additional purification in removing odors which may not be removed by the two filters and also in killing bacteria and other living organisms. Generator 64 comprises a structure of a type wherein a tube having a gaseous filling is subjected to high voltage which produces a radiation of energy through the tube for forming allotropic oxygen or ozone.

With reference to FIG. 5, an ultra-violet lamp 68 may be installed in the purifier in lieu of the ozone generator 64. The lamp 68 is mounted in end sockets 70 supported on a bracket 72 secured to the transverse wall 12. Shield 74 extends over the top of the lamp to reflect the rays downwardly. Lamp 68 serves to purify the air passing through the device by killing bacteria.

The air purifier includes suitable electrical control means for operating the parts thereof. For example, a transformer 76, FIG. 1, is provided for producing the high voltage necessary for the ozone generator 64. Such transformer is shown in full lines in FIG. 1 but is shown in phantom lines in FIGS. 2 and 3 for clarity of other parts. In addition, a transformer 78 is provided for reducing the AC circuit to a low voltage system for the blower 42. A blower control switch 80 is provided, FIG. 3, having on-off control means 82 and speed control means 84. With reference to FIG. 2, the base 10 has a bottom recess 86 in which is seated a control switch 88 for the ozone generator 64. The latter switch has an off position and preferably two or more positions controlling the output of the generator 64. The main input circuit is controlled by a safety switch 90, FIG. 1, having a spring operated switch arm 92 extending down into a recess 94 in the base 10. Recess 94 intersects the groove 26 and the end of arm 92 extends into the groove 26 for engagement by the bottom end of cover 20. Switch arm 92 is arranged such that when the cover 20 is in place it moves the arm down and closes the switch 90 so that the circuit is activated but when the cover is removed switch arm 92 springs up to open the circuit. Such comprises a precautionary arrangement whereby the fan and tubes 64 or 68 are without power when the cover is off.

In accordance with the present invention, an air purifier is provided which not only removes substantially all airborne impurities, including dust, pollen, bacteria, and the like but also removes odors and the like. The impurities that are not filtered out by the electrostatic filter are filtered out by the charcoal filter. Further yet, the ozone generator treats the air to kill bacteria as well as neutralize odor particles. The ultraviolet lamp 68 of FIG. 5 treats the air in combination with the two filters in that it kills living organisms that may have passed through the electrostatic filter.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. An air purifier comprising
   a. a housing having an inlet end and an outlet end,
   b. an electrostatic-type filter in said housing located adjacent to said inlet end,
   c. a charcoal filter in said housing located adjacent to said outlet end and having a plurality of longitudinally extending cell-like openings inclined upwardly to direct output from the housing toward the ceiling,
   d. blower means in said housing located between the inlet and outlet ends thereof for circulating room air through said housing from inlet to outlet ends for subjecting the air to the filters,
   e. air treating means in said housing comprising an ozone generator arranged to kill bacteria passing through the housing and to remove odor from the air,
   f. and an electric circuit for said ozone generator including regulating means for the voltage output of said ozone generator.

2. The air purifier of claim 1 wherein said air treating means comprises an ultra-violet lamp and said charcoal filter comprises coconut shell charcoal.

* * * * *